Sept. 9, 1958     A. KAGAN     2,851,007
AUTOMATIC POULTRY DRINKING VALVE
Filed Nov. 26, 1956
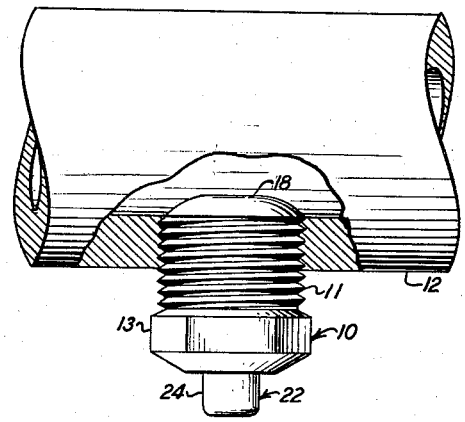
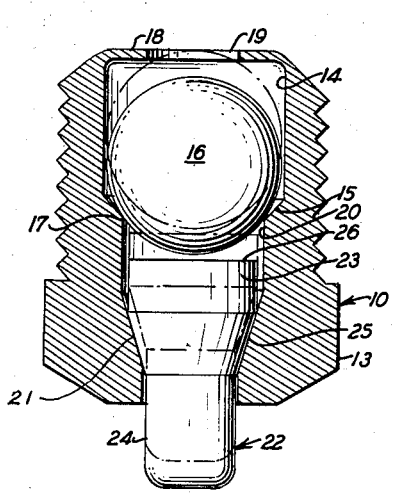 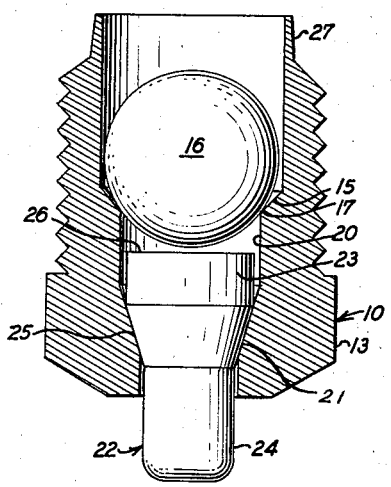
INVENTOR
AL KAGAN
BY *Herbert J. Jacobi*
ATTORNEY United States Patent Office 2,851,007
Patented Sept. 9, 1958

2,851,007

AUTOMATIC POULTRY DRINKING VALVE

Al Kagan, Los Angeles, Calif.

Application November 26, 1956, Serial No. 624,335

5 Claims. (Cl. 119—72.5)

This invention relates to fluid flow control devices and more particularly to an automatic poultry drinking valve for installation in the sidewall of a water supply conduit. This invention represents an improvement over that described and claimed in my prior Patent No. 2,690,160, issued September 28, 1954.

Heretofore, it has been common practice to provide drinking water for poultry in open pans or dishes and in the case of automatic devices for supplying such drinking water, it has been common practice to provide an open pan or the like to which water is supplied by means of a float controlled valve or similar device. While these devices operate efficiently insofar as providing water is concerned, nevertheless, the same become easily contaminated with dirt or other foreign material and furthermore, are frequently subject to freezing in cold weather, which prevents providing a proper supply of water for the poultry. While poultry requires a relatively large supply of drinking water, nevertheless, the amount consumed at any one time is relatively small and consequently, a drinking valve which will provide drops or a relatively small stream of water is all that is necessary to provide an adeqaute supply. It is further advantageous to supply some means which is automatically operable by the poultry in order to provide a supply of drinking water only when required thereby preventing contamination or freezing of the water with consequent harmful effects.

It is accordingly an object of this invention to provide an automatic poultry drinking valve which may be conveniently installed in the wall of a water supply conduit in such a manner as to be easily operable by the poultry and also in a manner to permit sufficient protection to prevent freezing of the conduit or valve.

A further object of the invention is the provision of an automatic poultry drinking valve for installation in a water supply conduit in which two independent valve members are employed to prevent leakage in the event one valve member fails to function properly.

A still further object of the invention is the provision of an automatic poultry drinking valve for installation in a water supply conduit, which valve may be conveniently operated by the poultry to provide drops of water in a sufficient quantity for drinking purposes.

Another object of the invention is the provision of an automatic poultry drinking valve which may be conveniently and economically manufactured from readily available material and supplied as a single assembly to be conveniently installed in the water supply conduit.

Further objects and advantages of the invention will be apparentf rom the following description taken in conjunction with the accompanying drawing wherein:

Fig. 1 is an elevational view with parts broken away and in section for greater clarity and showing a valve constructed in accordance with this invention and installed in the sidewall of a water supply conduit;

Fig. 2 is a longitudinal sectional view of a valve constructed in accordance with this invention and showing the manner of assembly of parts thereof; and Fig. 3 is a longitudinal sectional view of a completely assembled valve and showing the position of the parts in full line when closed and in dotted lines when open.

With continued reference to the drawing, there is shown a valve constructed in accordance with this invention and which may well comprise a body 10 of elongated generally cylindrical configuration and which may be constructed of metal or any other suitable material. The body 10 may be provided with a screw threaded portion 11 to be threadedly received in the wall of a water supply conduit 12, as shown in Fig. 1, and the body 10 may be provided with a wrench engaging portion 13 of hexagonal or other configuration, in order to facilitate installation or removal of the body 10 in the wall of the conduit 12.

The body 10 is provided with an axial bore extending therethrough and adjacent the inner end of the bore there is provided an annular recess 14 which terminates substantially midway of the length of the body in a tapered shoulder 15 providing a valve seat. A ball valve 16 is loosely disposed in the annular recess 14 and the ball valve 16 is engageable with the valve seat 15 at a point 17 which serves to provide a substantially line contact between the valve seat and the surface of the ball valve 16. As best shown in Fig. 3, the inner end of the body 10 is provided with an inwardly extending radial flange 18 which partially closes the recess 14 in order to retain the ball 16 therein. The flange 18 is provided with a central opening 19 through which water may flow, in a manner to be later described.

The tapered shoulder 15 merges into a substantially cylindrical wall 20 which terminates in a second tapered valve seat 21. It is to be noted, that the seat 21 is outwardly axially spaced from the tapered shoulder 15 forming the first valve seat. It is to be noted, that the second valve seat 21 is of a smaller diameter than the cylindrical wall 20 of the bore and that such cylindrical wall is of a smaller diameter than the first valve seat 15.

An elongated valve member 22 is slidably disposed in the bore outwardly of the first valve seat 15 and the valve member 22 is provided at the inner end thereof with an enlarged head 23 disposed in the cylindrical bore 20 between the seats 15 and 21. The valve member 22 is provided with an elongated, cylindrical outer end 24 projecting outwardly of the body 10 and a tapered valve surface 25 connecting the head 23 and the outer end 24, the tapered surface 25 being engageable with the tapered valve seat 21 to close the bore against passage of fluid therethrough. The inner end surface 26 of the head 23 on the valve member 22 is spaced from the ball 16 when the ball and valve member 22 are in engagement with the seats 15 and 21 respectively.

As shown in Fig. 2, the valve device of this invention is assembled by first inserting the valve member 22 within the bore to the position shown in Fig. 2 and thereafter inserting the ball valve 16 to the position shown. At this time, the portion 27 at the inner end of the body 10 is turned inwardly to form the flange 18, as shown in Fig. 3, and this serves to retain the ball 16 and valve member 22 in operative position in the body 10.

In operation, the drinking valve of this invention is installed in the wall of a water supply conduit 12 in a downwardly extending position, as shown in Fig. 1, in order that water flowing through the valve will form as drops on the lower surface of the outer end 24 of the valve member 22 and in order to provide for flow of water therethrough, it is only necessary for poultry to peck at the outer end 24 of the valve 22 which will displace the same inwardly out of engagement with the seat 21 and upon the inner surface 26 of the valve member 22, engaging the ball valve 16, the same will be moved inwardly out of engagement with the seat 15 thereby permitting flow of water through the valve. The drops of water forming on the outer end 24 of the valve member 22 provide an adequate supply for the poultry and obviously, no contamination of such drinking water is possible and both the supply conduit 12 and the valve device of this invention will be adequately protected against freezing.

It will be seen that by the above described invention, there has been provided a relatively simple, yet highly effective automatic poultry drinking valve and one which may be conveniently and economically constructed from readily available materials and supplied as a unitary device to be installed by the user in a water supply conduit.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A poultry drinking valve comprising a generally cylindrical one-piece body, means on said body for removably attaching the same to a water supply conduit, said body having an axial bore extending therethrough, the wall of said bore having an annular recess adjacent the inner end of said body, said recess terminating substantially midway of the length of said body in a tapered shoulder providing a valve seat, a ball valve disposed in said recess and engageable with said seat to close said bore, an inwardly extending radial flange on the inner end of said body partially closing said recess to retain said ball therein, a second tapered valve seat in the wall of said bore, said second seat being of smaller diameter than said first seat and outwardly axially spaced therefrom, the wall of said bore between said seats being cylindrical and of a greater diameter than said second seat and an elongated valve member slidably disposed in said bore outwardly of said first seat, said valve member having an inner enlarged head disposed in the bore between said seats, an elongated cylindrical outer end projecting axially from said bore outwardly of said body and a tapered surface connecting said head and said outer end and engageable with said second seat to close said bore, the inner end surface of said head being spaced from said ball when said ball and valve member are in seat engaging position whereby the outer end of said valve member may be engaged by poultry to move said member inwardly out of engagement with said second seat and into engagement with said ball to unseat the same and permit flow of water through said bore.

2. A poultry drinking valve comprising a generally cylindrical body, means on said body for removably attaching the same to a water supply conduit, said body having an axial bore extending therethrough, the wall of said bore having an annular recess adjacent the inner end of said body, said recess terminating substantially midway of the length of said body in a shoulder providing a valve seat, a ball valve disposed in said recess and engageable with said seat to close said bore, an inwardly extending flange on the inner end of said body partially closing said recess to retain said ball therein, a second tapered valve seat in the wall of said bore, said second seat being of smaller diameter than said first seat and outwardly axially spaced therefrom, the wall of said bore between said seats being cylindrical and of a greater diameter than said second seat and an elongated valve member slidably disposed in said bore outwardly of said first seat, said valve member having an inner enlarged head disposed in the bore between said seats, an elongated outer end projecting axially from said bore outwardly of said body and a tapered surface connecting said head and said outer end and engageable with said second seat to close said bore, the inner end surface of said head being spaced from said ball when said ball and valve member are in seat engaging position whereby the outer end of said valve member may be engaged by poultry to move said member inwardly out of engagement with said second seat and into engagement with said ball to unseat the same and permit flow of water through said bore.

3. A poultry drinking valve comprising a generally cylindrical body, means on said body for removably attaching the same to a water supply conduit, said body having an axial bore extending therethrough, the wall of said bore having an annular recess adjacent the inner end of said body, said recess terminating substantially midway of the length of said body in a shoulder providing a valve seat, a ball valve disposed in said recess and engageable with said seat to close said bore, an inwardly extending flange on the inner end of said body partially closing said recess to retain said ball therein, a second tapered valve seat in the wall of said bore, said second seat being of smaller diameter than said first seat and outwardly axially spaced therefrom, and an elongated valve member slidably disposed in said bore outwardly of said first seat, said valve member having an inner enlarged head disposed in the bore between said seats, an elongated outer end projecting axially from said bore outwardly of said body and a tapered surface connecting said head and said outer end and engageable with said second seat to close said bore, the inner end surface of said head being spaced from said ball when said ball and valve member are in seat engaging position whereby the outer end of said valve member may be engaged by poultry to move said member inwardly out of engagement with said second seat and into engagement with said ball to unseat the same and permit flow of water through said bore.

4. A poultry drinking valve comprising a generally cylindrical body, means on said body for removably attaching the same to a water supply conduit, said body having an axial bore extending therethrough, the wall of said bore having an annular recess adjacent the inner end of said body, said recess terminating substantially midway of the length of said body in a shoulder providing a valve seat, a ball valve disposed in said recess and engageable with said seat to close said bore, means on the inner end of said body partially closing said recess to retain said ball therein, a second tapered valve seat in the wall of said bore, said second seat being of smaller diameter than said first seat and outwardly axially spaced therefrom and an elongated valve member slidably disposed in said bore outwardly of said first seat, said valve member having an inner enlarged head disposed in the bore between said seats, an elongated outer end projecting axially from said bore outwardly of said body and a tapered surface connecting said head and said outer end and engageable with said second seat to close said bore, the inner end surface of said head being spaced from said ball when said ball and valve member are in seat engaging position whereby the outer end of said valve member may be engaged by poultry to move said member inwardly and out of engagement with said second seat and into engagement with said ball to unseat the same and permit flow of water through said bore.

5. A poultry drinking valve comprising a generally cylindrical body, means on said body for removably attaching the same to a water supply conduit, said body having an axial bore extending therethrough, the wall of said bore having an annular recess adjacent the inner end of said body, said recess terminating in a shoulder providing a valve seat, a ball valve disposed in said recess and engageable with said seat to close said bore, means on the inner end of said body partially closing said recess to retain said ball therein, a second tapered valve seat in the wall of said bore, said second seat being of smaller diameter than said first seat and outwardly axially spaced therefrom and an elongated valve member slidably disposed in said bore outwardly of said first seat, said valve member having an inner enlarged head disposed in the bore between said seats, an elongated outer end projecting axially from said bore outwardly of said body and a tapered surface connecting said head and said outer end and engageable with said second seat to close said bore whereby the outer end of said valve member may be engaged by poultry to move said member inwardly and out of engagement with said second seat and into said engagement with said ball to unseat the same and permit flow of water through said bore.

References Cited in the file of this patent

UNITED STATES PATENTS 1,168,933　　Burkley ＿＿＿＿＿＿＿＿＿＿＿＿ Jan. 18, 1916